Patented Sept. 25, 1928.

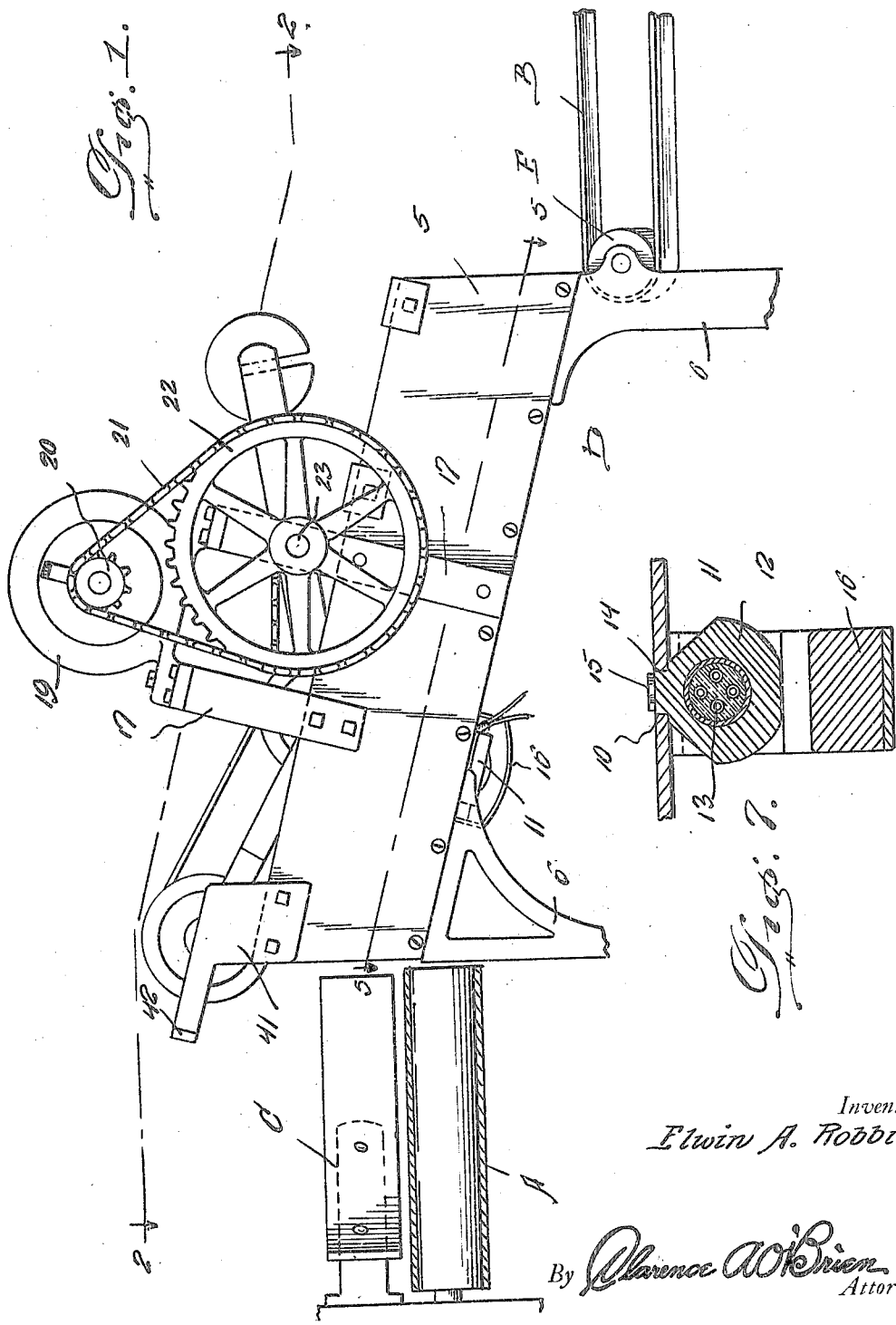

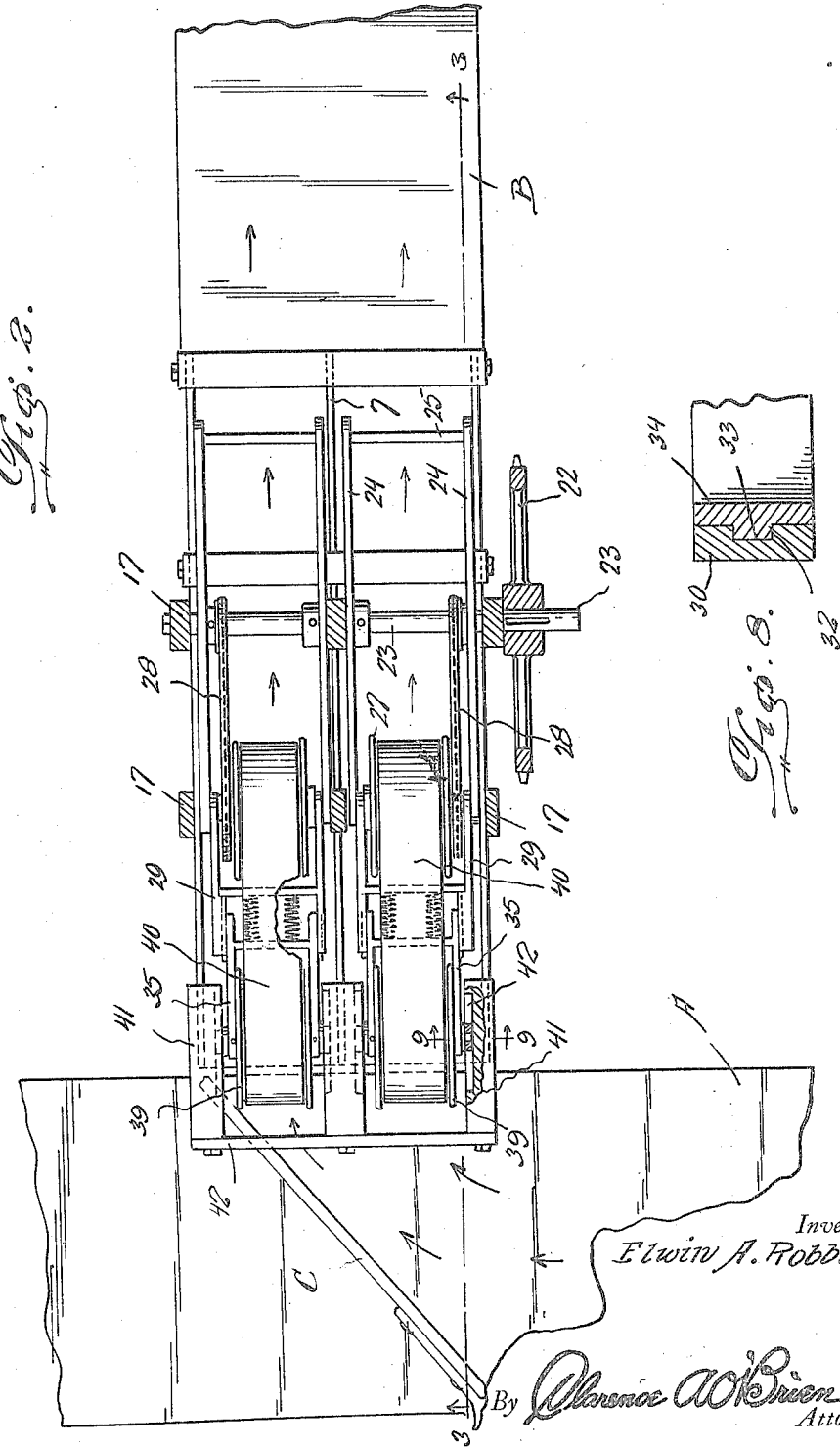

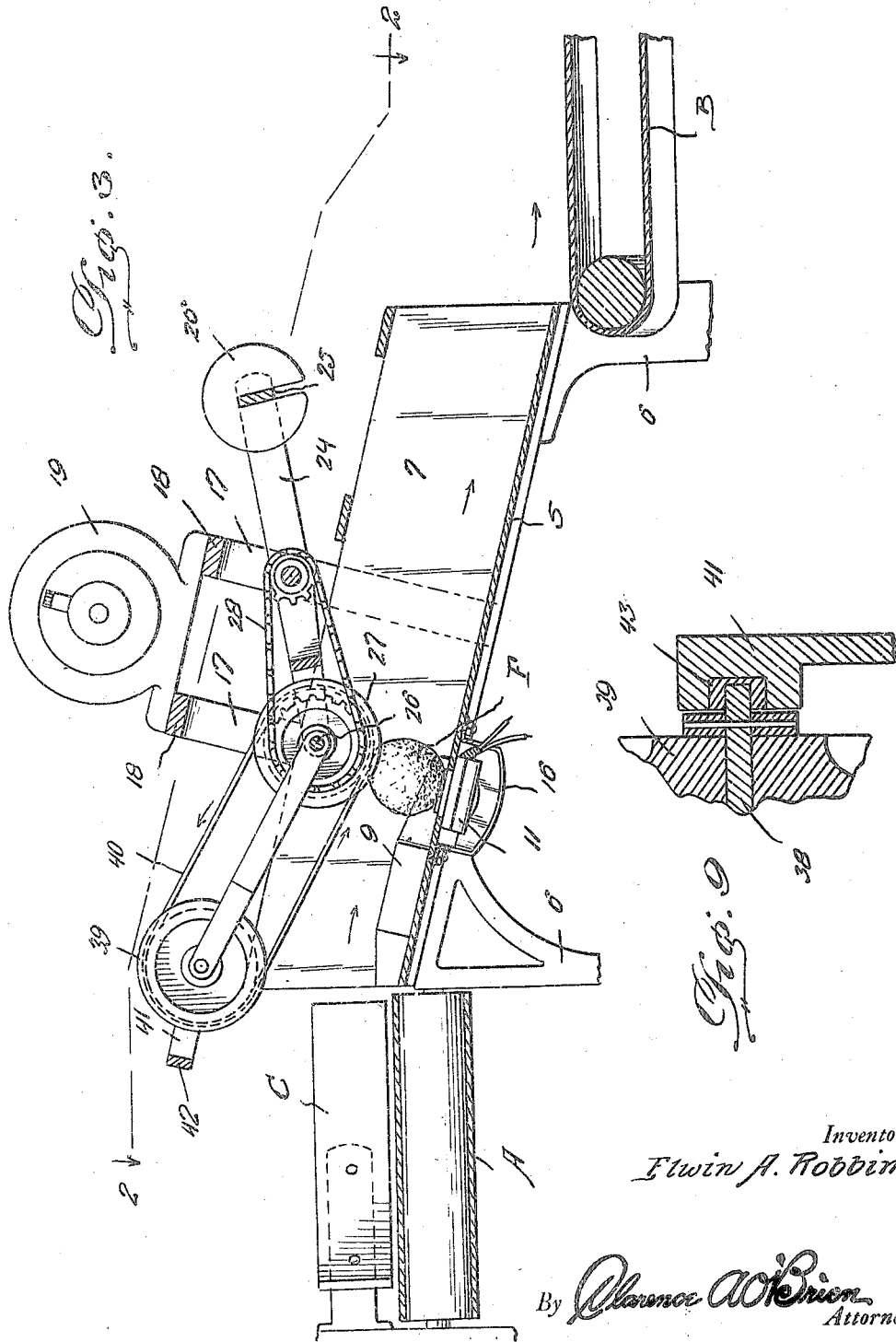

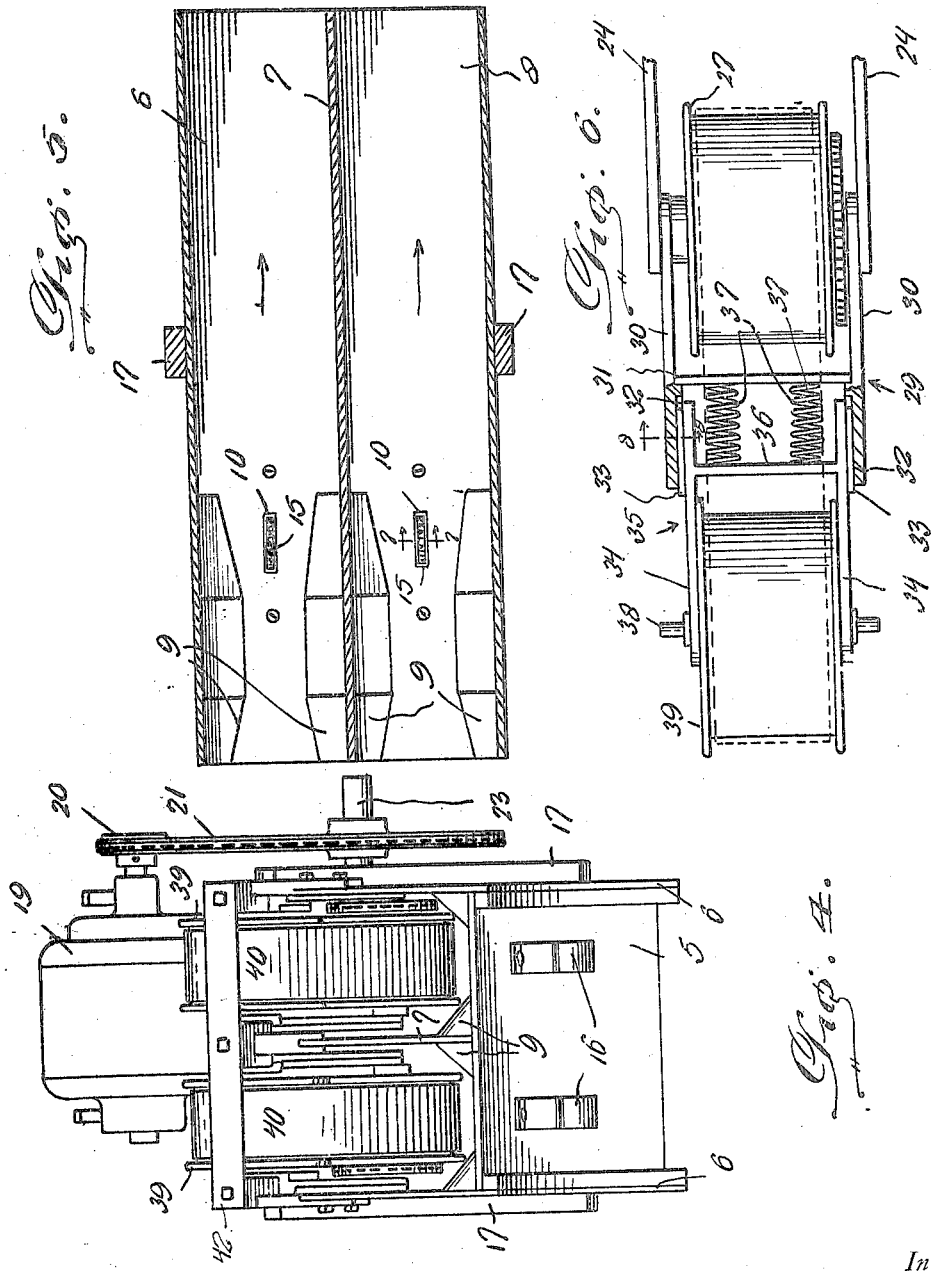

1,685,645

UNITED STATES PATENT OFFICE.

ELWIN A. ROBBINS, OF NASHUA, NEW HAMPSHIRE.

FRUIT-BRANDING MACHINE.

Application filed October 26, 1926. Serial No. 144,334.

This invention relates generally to machines for use in the orange and grape fruit growing and packing industry wherein trade-names, designs and the like are applied to the fruits for identifying the grower or shipper, and has more particular reference to a machine that is constructed for disposition between the grading belt and fruit sizing belts of orange and grape fruit handling machinery, and that automatically brands the fruit as the same passes therethrough.

The primary object of the invention is to provide a machine of this character wherein the trade-name or mark is actually burned into the skin of the fruit so that the same cannot be removed therefrom, and the fruit will until the removal of the skin bear the mark of the grower or shipper.

The invention further aims to provide a machine of this character wherein the fruit will be positively fed therethrough, and wherein the branding operation will be performed without an liability of the fruit becoming crushed during the branding operation.

It is a further and important object to provide a mechanism of this character that will readily accommodate itself to fruits of varying sizes, and this regardless of the rapidity of the fruit being fed to the machine.

A further object is to provide a branding machine for fruits that is so constructed as to permit of the disposition of the same between the previously mentioned grading belt and fruit sizing belts of fruit handling machinery that is usually employed in fruit packing houses, and this without requiring any alteration of the grading and sizing machinery, and that will in addition to the branding of the fruit convey the same from the grading belt to the fruit sizing belt.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a side elevation of a fruit grading machine constructed in accordance with the present invention, the same being shown as actually disposed between a fruit grading belt and a fruit sizing belt of fruit handling machinery.

Figure 2 is a longitudinal sectional view taken substantially upon the line 2—2 of Figure 1 and looking downwardly in the direction of the arrows.

Figure 3 is a longitudinal vertical section disclosing the actual position of an orange or grape fruit at the time of being branded.

Figure 4 is a front end elevation of the machine per se.

Figure 5 is a longitudinal section through the machine frame.

Figure 6 is a view partly in top plan and partly in cross section of one of the fruit feeding and pressing units of the device.

Figure 7 is an enlarged transverse section taken substantially upon the line 7—7 of Figure 5 for more clearly disclosing the construction of the branding unit.

Figure 8 is a similar view taken substantially upon the line 8—8 of Figure 6 for more clearly disclosing the sliding connection between the pulley hangers of the fruit feeding and pressing units, and Figure 9 is also a similar view taken substantially upon the line 9—9 of Figure 2 for more clearly disclosing the sliding connection between the outer pulleys of the fruit feeding and pressing units, and the machine frame.

Now having particular reference to the drawings, A in Figures 1, 2 and 3 designates a conventional grading belt of a fruit grading mechanism, while B designates a conventional fruit sizing belt, the inner end of which terminates in spaced transverse relation with respect to the grading belt A, and slightly therebeneath as clearly indicated in Figures 1 and 3. In carrying out my invention, there is disposed above the fruit grading belt A a diagonally disposed fruit switching plate C for leading the fruit from the grading belt A into the branding machine, designated generally D. At this point it may be well to state that a plurality of these machines are provided at spaced points throughout the length of the grading belt so as to receive and brand the various characters of oranges or grape fruits that are graded by the grading belt A.

The grading machine per se consists of an elongated box-like frame 5 open at its opposite ends and at its top side, the opposite ends of the frame being cut upon an angle with respect to the bottom wall of the same so that when the machine is supported in position between the grading belt and fruit sizing belt, the frame will be in inclined position so that the fruit after being branded will roll through the frame onto the sizing belt B. At the ends of the frame 5 are suitable supporting legs 6—6, and as disclosed in Figures 1 and 3, it is preferable that the adjacent end roller E of the sizing belt B be arranged between the legs of the frame at the lower end thereof. Arranged longitudinally within the center of the frame 5 is a perpendicular partition wall 7 for dividing the frame into a pair of fruit passageways 8—8. It is of course to be understood that the cross sectional area of the frame may be increased and other partitions disposed therein for providing additional passageways if desired.

At the inlet of each passageway 8 the inner faces of the side walls thereof, as well as the opposite faces of the partition wall are provided with longitudinally extending guide blocks 9, the inner faces of which are tapered as clearly indicated in Figure 4 so that the fruit passing into the frame will be correctly centered upon the bottom wall thereof. Within each passage way 8, the bottom wall of the frame 5 is constructed with a longitudinal opening 10 between the inner ends of the respective guide blocks while suspended from the under side of the frame beneath each opening is a branding unit 11, consisting of a metallic barrel 12 having a longitudinal bore for receiving an electrical heating unit 13 in the form of a cartridge. The top side of each barrel 12 is formed with a longitudinal rib 14 that extends through the adjacent opening 10 of the frame bottom wall and that is formed upon its top side with branding indicia or markings 15 that will project above the surface of the frame bottom wall in each passage way 8 as is clearly indicated in Figure 7. The reference character 16 designates generally a support for each branding unit and insomuch as no claim is made to the particular formation of the support, a specific description thereof is not believed necessary.

Upon opposite side walls of the frame 5 are spaced vertically extending arms 17—17 the upper ends of which terminate above the frame, while transversely aligned ones of the arms are interconnected by cross bars 18—18 for supporting an electric motor 19. One end of the armature shaft of this motor is equipped with a small sprocket gear 20 over which is trained an endless chain 21 that is in turn trained over a larger sprocket wheel 22 upon the end of a cross shaft 23 that is journaled through openings in the rearmost transversely aligned arms 17—17.

Within each passageway 8 of the machine frame 5 is a fruit conveying and pressing unit of identical construction, and therefore, a description of one will suffice for both. Each conveying and pressing unit consists of a pair of spaced parallel bars 24—24 that are pivoted at their centers to the shaft 23, the rearmost ends being interconnected by a cross bar 25 upon which may be disposed counterbalancing weights 26. Supported between the opposite ends of these bars 24—24 is a pulley shaft 26 that carries a flanged pulley 27. Each pulley shaft 26 is operatively connected to the shaft 23 by an endless chain 28 trained over sprocket wheels upon the pulley shaft and over said shaft 23 as clearly disclosed in Figures 2 and 3. Extending forwardly of the pulley 27 is a frame 29 consisting of a pair of spaced parallel bars 30—30, the inner ends of which are pivotally connected to the ends of the pulley shaft 26, while interconnecting said bars in spaced relation with the opposite ends thereof is a cross arm 31. The ends of the bars 30 outwardly of the cross arm 31 are longitudinally slotted as at 32 upon the inner faces thereof, these slots receiving ribs 33—33 upon the outer faces of spaced parallel bars 34—34 of a pulley carrying frame 35, these bars 34—34 being interconnected by a cross bar 36 in spaced relation with the inner ends thereof, while between this bar 36 and the arm 31 are expansible coil springs 37—37 for normally forcing the frame 35 outwardly with respect to the frame 29. Journaled between the outer ends of the bars 34—34 of said frame 35 is a pulley shaft 38 upon which is keyed a flanged pulley 39 there being trained over the pulley 39 and the pulley 27 an endless belt 40 that moves in the direction of the arrows in Figure 3.

Upon the inner end of the frame sidewalls as well as the partition wall 7 and at the upper edges thereof are L-shaped bracket plates 41, the outer ends of which are interconnected by a cross bar 42. The inner faces of the outermost bracket plates are longitudinally slotted as at 42′, while the opposite faces of the central bracket are similarly slotted as indicated by the dotted lines in Figure 2. The outer ends of the pulley shafts 38 of the pulleys 39 are equipped with slide blocks 43, see Figure 9, that move within the slots of said bracket plates 41 to facilitate the proper movement of the pulleys and shafts without interferring with the rotation thereof.

Obviously, due to the weight of the innermost pulleys 27 of the feeding and pressing unit said pulleys will hang downwardly as indicated in Figures 1 and 2 so that the weight of the same will act against the fruit F in Figure 3 so as to press the same upon the indicia 15 of the branding unit resulting in the proper branding of the fruit as the same passes over the unit. By reason of the belt 40 of the feeding and pressing units, the fruit is positively fed over the branding units, and by reason of the spring connection between the pulley frame 29 and 35, the proper tension will always be maintained upon the belt 40 so as to facilitate the proper force feeding of the fruit over the branding units. The pressure upon the fruit may be regulated by the provision of the removable counterbalancing weight 26.

It will thus be seen that I have provided a highly novel, simple, and efficient fruit branding machine that is well adapted for all the purposes heretofore designated, and even though I have herein shown and described the invention as consisting of certain detail structural elements it is of course to be understood that some changes may be made therein without affecting the spirit and scope of the appended claims.

Having thus described the invention, what I claim as new and desire to secure by Letters Patent is:—

1. In a machine for marking fruit, a die, and pivotally mounted means comprising an endless belt gravitally engaging said fruit for rolling it across the die, and a resilient tensioning means associated with the belt to accommodate the belt to different sized fruit.

2. In a machine for marking fruit, a trough for receiving fruit to be branded, a die in the trough, a frame, means for pivotally mounting the frame intermediate its ends, a shaft journaled in one end of the frame, a pulley on the shaft, extensible arms on the shaft one to each side of the pulley, means for slidably supporting the ends of the arms remote from the shaft, a pulley journaled between said ends of the arms, endless belts trained over said pulleys, and yieldable means associated with the arms for normally holding them extended to tension the belt and allow the belt to accommodate itself to different sized fruit.

In testimony whereof I affix my signature.

ELWIN A. ROBBINS.